(12) United States Patent
Hodgson

(10) Patent No.: US 9,004,242 B2
(45) Date of Patent: Apr. 14, 2015

(54) APPARATUS FOR ABSORBING SHOCKS

(76) Inventor: Darel E. Hodgson, Palo Alto, CA (US)

( * ) Notice: Subject to any disclaimer, the term of this patent is extended or adjusted under 35 U.S.C. 154(b) by 0 days.

(21) Appl. No.: 12/737,843

(22) PCT Filed: Sep. 9, 2009

(86) PCT No.: PCT/US2009/005047
§ 371 (c)(1),
(2), (4) Date: Feb. 22, 2011

(87) PCT Pub. No.: WO2010/030340
PCT Pub. Date: Mar. 18, 2010

(65) Prior Publication Data
US 2011/0148015 A1 Jun. 23, 2011

Related U.S. Application Data

(60) Provisional application No. 61/191,631, filed on Sep. 9, 2008.

(51) Int. Cl.
*F16F 9/32* (2006.01)
*F16F 7/12* (2006.01)

(52) U.S. Cl.
CPC ........... *F16F 7/12* (2013.01); *F16F 2224/0258* (2013.01)

(58) Field of Classification Search
USPC .............. 188/266.7; 267/136, 140.14, 140.15
See application file for complete search history.

(56) References Cited

U.S. PATENT DOCUMENTS 3,399,103 A * 8/1968 Salyer et al. .................. 428/116
3,876,243 A * 4/1975 Bell et al. ...................... 293/110
4,569,865 A * 2/1986 Placek ............................ 428/31
5,398,916 A    3/1995 Kramer
5,842,312 A   12/1998 Krumme
(Continued)

FOREIGN PATENT DOCUMENTS

DE          4128451 C1 * 12/1992   .............. B23B 29/14

OTHER PUBLICATIONS

Machine translation of DE 412851.*

(Continued)

*Primary Examiner* — Bradley King
(74) *Attorney, Agent, or Firm* — T. H. P. Richardson

(57) ABSTRACT

Apparatus for absorbing shock, particularly repetitive shocks, comprises a frame and a shock-absorbing component comprising a shape memory alloy (SMA). In one type of apparatus, one or more SMA rings (65) are mounted on brackets (64) on a frame (62, 63) so that shock received by the frame from one direction changes the shape of the rings into ellipses with major chords in a first direction, and shock received by the frame from the opposite direction changes the shape of the rings into ellipses with major chords in a second direction which is at right angles to the first direction. In other types of apparatus, SMA shock-absorbing components (16, 27, 37, 46, 89) are mounted in a frame (11, 12,13,14,15,17, 21, 22, 24, 25, 26, 31, 32, 34, 35, 41, 42, 43, 44, 45, 47) so that the way in which the shock-absorbing component is deformed is independent of the direction of the shock received by the frame. The shock-absorbing components preferably include a superelastic SMA, optionally in combination with a martensitic SMA. The apparatus is useful for a wide variety of purposes, including the protection from shock of medical devices, electronic assemblies, vehicles, bridges and buildings.

4 Claims, 11 Drawing Sheets

(56) References Cited

U.S. PATENT DOCUMENTS

| | | |
|---|---|---|
| 6,464,200 B1 | 10/2002 | Hines |
| 6,637,995 B1 | 10/2003 | White |
| 6,796,408 B2 | 9/2004 | Sherwin |
| 7,029,044 B2 * | 4/2006 | Browne et al. ................. 293/137 |
| 7,398,964 B2 | 7/2008 | Knowles |
| 7,707,957 B1 * | 5/2010 | Dudt et al. .................... 114/312 |
| 2005/0199455 A1 * | 9/2005 | Browne et al. ............. 188/266.4 |
| 2009/0025833 A1 | 1/2009 | Schussler |

OTHER PUBLICATIONS

Yong Liu et al, Damping Capacity of Shape Memory Alloys, Manside Presentation, pp. 69-72, Jan. 1999.

Cardone et al, Experimental Tests on SMA Elements, Manside Presentation, pp. 85-103, Jan. 1999.

Cardone et al, Experimental Tests on SMA-based seismic devices, Manside Presentation, pp. 135-156, Jan. 1999.

Desroches et al, Shape Memory Alloys in Seismic Resistant Design and Retrofit, Journal of Earthquake Engineering, vol. 7, No. 3, 2003, pp. 1-15.

Auricchio et al, Earthquake Performance of Steel Frames with Nitinol Braces, Journal of Earthquake Engineering, vol. 10, 2006,, pp. 1-15.

Tyber et al, Structural Engineering with NiTi, I Basic Materials Characterization Journal of Engineering Mechanics, Sep. 2007, pp. 1-12 and 1019-1029.

McCormick et al, Structural Engineering with NiTi, II Mechanical Behavior and Scaling, Journal of Engineering Mechanics, Sep. 2007, pp. 1019-1029.

* cited by examiner

FIG. 2B       FIG. 2C

APPARATUS FOR ABSORBING SHOCKS

CROSS-REFERENCE TO RELATED APPLICATION

This application is an application under 35 USC 371 based on PCT/US 2009/005047 and claims priority from United States Provisional Application 61/191,631, filed Sep. 9, 2009. The entire disclosure of that application is incorporated herein by reference for all purposes.

FIELD OF THE INVENTION

This invention relates to apparatus and methods for absorbing shock.

BACKGROUND OF THE INVENTION

This invention provides novel shock-absorbing methods and apparatus making use of SMAs, and novel shock-absorbing components for use in those other methods and apparatus. As further explained below, SMAs can absorb shock in finite amounts, typically up to about 7%, by a change in the crystal structure of the alloy. Superelastic SMAs will recover to (or towards) an original shape spontaneously upon removal of the deforming forces. Martensitic SMAs can be recovered to (or towards) an original shape by reversal of the deforming forces or by heating to a transformation temperature.

Many different apparatus for absorbing shocks are known. Some shock-absorbing apparatus, often referred to as damping apparatus, will absorb repetitive shocks. Shock-absorbing devices comprising a shape memory alloy (SMA) have been proposed. However, the known devices containing SMAs have one or more disadvantages. For information about shape memory alloys, which are well-known to those skilled in the art, and the use of particular SMAs in particular shock-absorbing apparatus, reference may be made for example to U.S. Pat. Nos. 5,398,916; 5,842,312; 6,796,408; 7,398,964; U.S. 2009/002-5833; WO 2007/039271; Auricchio et al, J., Earthquake Engineering, 10, 1 (2006), 1-22; Duerig et al, Engineering Aspects of Shape Memory Alloys, 1990; Liu et al., Proc, Final Workshop of Brite-Euram Manside Project, II 59-18; Tyber et al., J. Eng, Mechanics, ASCE, September 2007, 1009-1029; Desroches et al, J, Earthquake Engineering, 8, 415-429; Krumme et al. Proceedings of SPIE, San Diego, Calif., USA, v. 2445, pp 225-240; and Cardone et al., Proc, Final Workshop of Brite-Euram Manside Project, II 5-103. The entire disclosure of each of those patents and literature references is incorporated herein by reference for all purposes.

SUMMARY OF THE INVENTION

In a first aspect, this invention provides apparatus for absorbing shock from a first direction and from a substantially different second direction, the second direction, comprising a component which is opposite to the first direction, e.g. being the opposite direction, the apparatus comprising
(1) a frame which is distorted in a first way when the apparatus is subjected to shock from the first direction and in a second way when the apparatus is subjected to shock from the second direction, and
(2) a shock-absorbing component which
  (i) comprises a shape memory alloy (SMA), and
  (ii) is linked to the frame so that the shock-absorbing component is distorted in substantially the same way both when the frame is distorted in the first way, and when the frame is distorted in the second way.

The first aspect of the invention also includes methods in which shock is absorbed by such apparatus.

In one embodiment of the first aspect of the invention, the shock-absorbing component is axially compressed when a shock causes either axial shortening or lengthening of the frame. In this embodiment, the shock-absorbing component can be self-limiting, in the sense that, after absorbing shock by deformation as a result of a change in the crystal structure of the SMA, further deformation requires permanent plastic deformation of the metal itself at significantly greater stresses. Alternatively, the apparatus can comprise one or more stops which prevent further compression of the shock-absorbing component before the SMA ceases to absorb shock by changes in the crystal structure of the SMA.

In another embodiment of the first aspect of the invention, the shock-absorbing component is axially extended when a shock causes either axial shortening or lengthening of the frame. In this embodiment, the apparatus comprises stops which prevent further extension of the shock-absorbing component before the SMA ceases to absorb shock by changes in the crystal structure of the SMA.

In a second aspect, this invention provides apparatus for absorbing shock from a first direction and from a substantially different second direction, the second direction, comprising a component which is opposite to the first direction, e.g. being the opposite direction, the apparatus comprising
(1) a frame which is distorted in a first way when the apparatus is subjected to shock from the first direction and in a second way when the apparatus is subjected to shock from the second direction, and
(2) a shock-absorbing component which
  (i) comprises at least two metals selected from superelastic shape memory alloys, martensitic shape memory alloys, and non-SMA metals;
  (ii) is in the form of a bar, and
  (iii) is linked to the frame so that distortion of the frame in the first way distorts the shock-absorbing component by bending it in a first direction, and distortion of the frame in the second way distorts the shock-absorbing component by bending it in a second direction.

The second aspect of the invention also includes methods in which shock is absorbed by such apparatus.

In a third aspect, this invention provides apparatus for absorbing shock from a first direction and from a substantially different second direction, the second direction comprising a component which is opposite to the first direction, e.g. being the opposite direction, the apparatus comprising
(1) a frame which is distorted in a first way when the apparatus is subjected to shock from the first direction and in a second way when the apparatus is subjected to shock from the second direction, and
(2) a shock-absorbing component which
  (i) comprises a shape memory alloy (SMA),
  (ii) is in the form of a bar, for example a .rod or tube having a circular cross section, and
  (iv) is linked to the frame so that distortion of the frame in the first way distorts the shock-absorbing component by twisting at least part of it in a first direction, and distortion of the frame in the second way distorts the shock-absorbing component by twisting at least part of it (preferably the same part or parts as were twisted in the first direction) in a second direction, preferably without substantially bending the shock-absorbing component.

The third aspect of the invention also includes methods in which shock is absorbed by such apparatus.

In a fourth aspect, this invention provides apparatus for absorbing shock from a first direction and from a substantially different second direction, the second direction, comprising a component which is opposite to the first direction, e.g. being the opposite direction, the apparatus comprising
- (1) a frame which is distorted in a first way when the apparatus is subjected to shock from the first direction and in a second way when the apparatus is subjected to shock from the second direction, and
- (2) a shock-absorbing component which
  - (i) comprises a shape memory alloy (SMA),
  - (ii) is in the form of a hollow member having a cross-section, preferably a closed cross-section, which defines a void within the member, for example a tube or a ring having an annular cross section, and
  - (iii) is linked to the frame so that distortion of the frame in the first way distorts the shock-absorbing component by changing its cross-section in a first way, and distortion of the frame in the second way distorts the shock-absorbing component by changing its cross-section in a second way.

In this aspect, the shock-absorbing component can be self-limiting, in the sense that, after absorbing shock by deformation as a result of a change in the crystal structure of the SMA, further deformation requires permanent plastic deformation of the metal itself at significantly greater stresses. Alternatively, the apparatus can comprise one or more stops which prevent further deformation of the shock-absorbing component before the SMA ceases to absorb shock by changes in the crystal structure of the SMA. In one embodiment of this aspect of the invention, the shock-absorbing component is in the form of a ring and the frame is linked to the interior and the exterior of the ring so that a major chord of the ring decreases when the frame is shortened, and increases when the frame is lengthened, or vice versa, thus subjecting the ring to complex deformation forces which include compression or elongation as well as bending.

In a fifth aspect, this invention provides apparatus for absorbing shock which comprises
- (1) a frame, and
- (2) a shock-absorbing component which
  - (i) comprises a first SMA component which comprises a martensitic SMA and a second SMA component which comprises super elastic shape memory alloy, and
  - (ii) is linked to the frame so that distortion of the frame distorts the shock-absorbing component.

This apparatus can be used to absorb shock a single time, in which case recovery of the first SMA is not important. Preferably, however, the apparatus will absorb repeated shocks, in which case the first and second SMA components are linked to each other, e.g. are in direct contact with each other, optionally with the aid of interlocking sections, so that if distortion of the shock-absorbing component causes distortion of the second SMA component, recovery of the second SMA component, after the shock has been removed, restores the first SMA component to (or towards) its original shape. Alternatively or additionally, the first SMA component can be recovered, after the shock has been removed, by heating it to a temperature which will cause it to revert to its original shape. In the fifth aspect of the invention, the first, martensitic, SMA component will absorb the shock initially, since the second, superelastic, component initially deforms elastically. Thereafter (assuming that the shock is large enough to involve the second, superelastic, component), the shock will be absorbed by both components. In one embodiment of the fifth aspect of the invention, the shock-absorbing component comprises alternating layers of martensitic SMA and superelastic SMA The shock-absorbing component is in itself novel and forms part of the third aspect of the invention. The fifth aspect of the invention also includes methods in which shock is absorbed by such apparatus.

In a sixth aspect, this invention provides apparatus for absorbing shock which comprises
- (1) a frame, and
- (2) a first shock-absorbing component which comprises an SMA, and
- (3) a second shock-absorbing component which comprises a non-SMA, a material, for example a non-SMA metal, e.g. lead or mild steel;

This apparatus can be used to absorb shock a single time, which case shape recovery of the second shock-absorbing component is not important. Preferably however, the apparatus will absorb repeated shocks, in which case the first and second components are linked to the frame and/or to each other, e.g. are in direct contact with each other, so that if distortion of the frame causes non-elastic distortion of the second component, shape recovery of the SMA component after removal of the shock (spontaneously if the SMA is a super elastic SMA, and with the aid of heat to the SMA if it is a martensitic SMA), restores the second component to (or towards) its original shape. The combination of shock-absorbing components is in itself novel and forms part of the sixth aspect of the invention. The sixth aspect of the invention also includes methods in which shock is absorbed by such apparatus.

BRIEF DESCRIPTION OF THE DRAWINGS

The invention is illustrated in the accompanying drawings, in which

FIGS. 2B, 2C and 2D are cross-sections through FIG. 2A;

DETAILED DESCRIPTION OF THE INVENTION

Figure 1A:
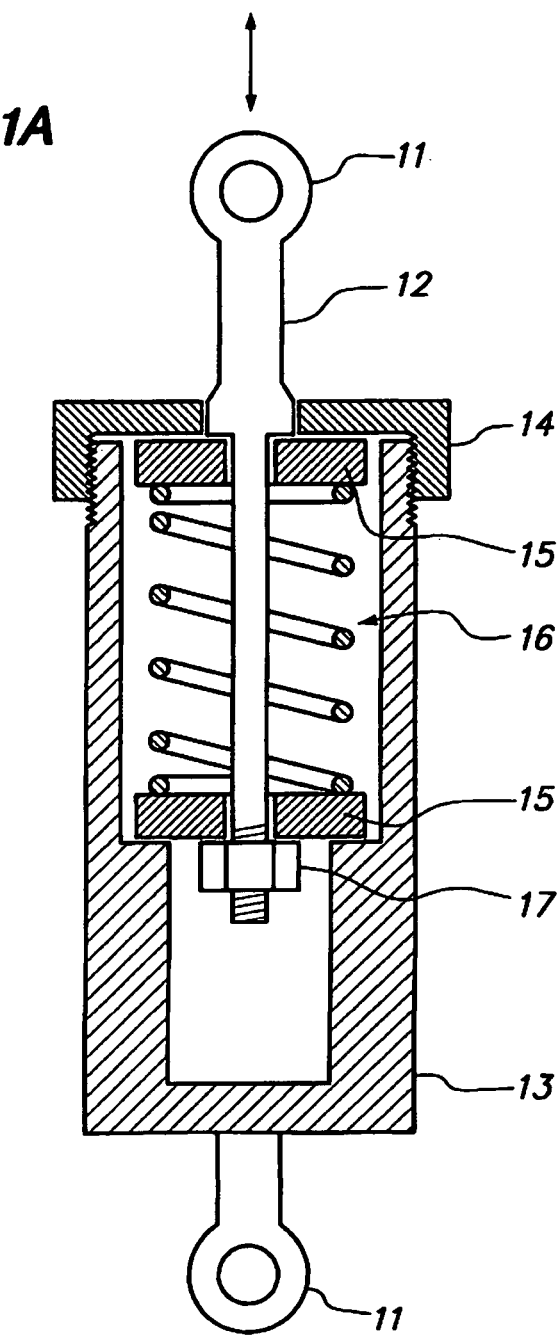
FIG. 1A is a cross-sectional view of a damping device which comprises a shock-absorbing component in the form of a superelastic SMA helical coil spring and a frame which surrounds the shock-absorbing component and subjects it to axial compressive loading both when axial length of the frame is increased and when the axial length of the frame is decreased.

In the Summary of the Invention above, the Detailed Description of the Invention below, and the accompanying drawings, reference is made to particular aspects and features,(including for example components, ingredients, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular Figure, that feature can also be used, to the extent appropriate, in the context of other particular aspects, embodiments, claims and Figures, and in the invention generally. For example, in any of the first, second, third, and fourth aspects of the invention, the shock-absorbing component can comprise first and second components as described in the fifth or sixth aspect of the invention. The invention disclosed herein includes embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, an apparatus " comprising" (or "which comprises") components A, B and C can contain only components A, B and C, or can contain not only components A, B and C but also one or more other components. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)", this means a range whose lower limit is the first number and whose upper limit is the second number. For example, "from 8 to 20 inches" or "8-20 inches" means a range whose lower limit is 8 inches, and whose upper limit is 20 inches. The terms "plural", "multiple", "plurality" and "multiplicity" are used herein to denote two or more than two features.

Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features (except where the context excludes that possibility). Where reference is made herein to two or more features, this includes the possibility that the two or more features are replaced by a lesser number or greater number of features providing the same function (except where the context excludes that possibility). The numbers given herein should be construed with the latitude appropriate to their context and expression; for example, each number is subject to variation which depends on the accuracy with which it can be measured by methods conventionally used by those skilled in the art.

In this specification, parts and percentages are by weight, except where otherwise noted. Temperatures are in degrees Centigrade (° C.).

This specification incorporates by reference all documents referred to herein and all documents filed concurrently with this specification or filed previously in connection with this application, including but not limited to such documents which are open to public inspection with this specification.

The term shape memory alloy (often abbreviated to SMA) is used herein to denote an alloy which can be converted from a first shape to a second shape by deformation while the alloy is at a first relatively low temperature, will retain that second shape while it remains at a sufficiently low temperature, but will revert to (or towards) the first shape if it is heated to a second relatively higher temperature. The technology of shape memory alloys is well-known to those skilled in the art and is described, for example, in the documents incorporated by reference herein. Any SMA alloy can be used in this invention, and when the apparatus includes more than one SMA, the SMAs can be the same or different. Preferred SMAs are nickel titanium alloys, which are commonly known as Nitinol.

The present invention makes little or no use of the possibility of transforming the shape of SMAs through changes in temperature, but rather with an associated characteristic of SMAs, which is their ability to absorb shock. [The possibility of transforming the shape of SMAs through changes in temperature is used in this invention only when recovery of a martensitic SMA shock-absorbing component, after removal of shock, is effected through heating the component.] This associated characteristic results from the fact that when an article composed of an SMA is deformed, the crystal structure of the SMA changes as the deformation progresses.

Superelastic SMAs (sometimes referred to as SEAs) are SMAs which, at the temperature of use in this invention (typically. 0-30° C., usually room temperature of 20-25° C.) are above the transformation temperature and have a crystal structure which is at least partly austenitic, with the remainder of the crystal structure (if any) being a twinned martensitic structure. When a superelastic SMA is subject to progressive deformation, its crystal structure is progressively converted towards an untwinned martensitic structure of one tilt or another, depending upon whether the SMA is extended or compressed. Typically, a superelastic SMA will first deform elastically by a small amount (e.g. about 1%, during which time it will not absorb shock) and will then deform superelastically (thus absorbing shock) until a limit is reached when the deformation has converted all of the superelastic SMA to a detwinned martensitic crystal structure (e.g. at a deformation of about 7%). Further deformation may result in some permanent damage to the superelastic SMA. If the deformation does not exceed the limit, then removal of the deforming forces will cause the superelastic SMA to revert to (or towards) its former shape and crystal structure, This deformation and recovery can occur thousands of times with negligible damage to the alloy.

Martensitic SMAs (sometimes referred to as M-SMAs) are SMAs, which, at the temperature of use in this invention, are below the transformation temperature and have a martensitic crystal structure, which includes a number of twinned variants of the martensitic structure, with the relative proportions of the twinned variants being dependent on the deformation (if any) of the SMA. Martensitic SMAs absorb shock when subject to the small deformations which produce only elastic deformation of a superelastic SMA, my movement of twinned boundaries, the frictional resistance of this process absorbing energy, and continue to absorb shock thereafter, by conversion to crystallographic variants of the martensitic structure, which favor the deformation. In some embodiments of the invention, therefore, particularly when it is expected that the damping apparatus may be subject to small shocks, a shock-absorbing component comprising a martensitic SMA is used in combination with a shock-absorbing component comprising a superelastic SMA. Preferably, the two shock-absorbing components are linked together, directly or through the frame, so that recovery of the superelastic SMA, when the stress is removed, causes the martensitic SMA component to revert to (or towards) its shape in the absence of shock. Alternatively, the martensitic SMA component may be restored to (or towards) its original shape by heating. Similarly, a shock-absorbing component comprising a non-SMA material, for example a metal other than an SMA, e.g. lead or mild steel, can be used in combination with a superelastic SMA to which it is linked so that recovery of the superelastic SMA, when the stress is removed, the other shock-absorbing component, restores the other component to (or towards) its original shape.

Where reference is made herein to the frame and the shock-absorbing component being "linked" to each other, or to two shock-absorbing components being "linked" to each other, the term "linked" includes any form of interaction between the articles in question which permits the desired operation of the apparatus. Often the articles in question will be in direct contact with each other, for example a tube or ring comprising an inner layer of a martensitic SMA and an outer layer of a superelastic SMA. However, the invention includes the possibility that the articles are linked through an intermediary, which can, for example, increase or decrease the relative movement of the articles. For example, in the third aspect of the invention, a rod or tube of a martensitic SMA can be connected in line with, and between two superelastic SMA tubes or rods, with its ends directly contacted by the ends of the two superelastic tubes or rods, or separated from them by parts of the frame'

One embodiment of the first aspect of the invention is an apparatus which comprises (1) at least one superelastic SMA (SEA) component, and (2) a frame to which the SEA component is attached and which is constructed so that, both when the frame is shortened by a shock and when the frame is extended by a shock, the SEA component is stretched. Advantages of this apparatus (which is sometimes referred to herein as the "tension device") over that disclosed in U.S. Pat. No. 5,842,312 include (1) the same SEA components are stretched, in both directions of a shock, (2) the frame can include one or more stops which ensure that the SEA component is not stretched beyond its superelastic limit, and (3) a wide variety of SEA components (in addition to the wires and ribbons disclosed in U.S. Pat. No. 5,842,312) can be used. In some such apparatus, the SEA component, in the absence of any shock applied to the apparatus, is stretched so that the SEA component is a little way into the bottom end of its stress-strain hysteresis, for example 5-15% into its stress-strain hysteresis, so that a shock applied to the frame stretches the SEA component further into its stress-strain hysteresis. The apparatus can include means for adjusting how much the SEA component is stretched in the absence of shock. In other such apparatus, the SEA component is not stretched into its stress-strain hysteresis in the absence of a shock, but is stretched into its stress-strain hysteresis when a sufficiently large shock is applied to the frame. In those other embodiments, initial shock-induced changes in the frame may or may not cause stretching of the SEA component into its stress-strain hysteresis.

Another embodiment of the first aspect of the invention is an apparatus which comprises (1) at least one SEA component, and (2) a frame to which the SEA component is attached and which is constructed so that, both when the frame is shortened by a shock and when the frame is extended by a shock, the SEA component is compressed. Advantages provided by this apparatus (which is sometimes referred to herein as the "compression device") over the apparatus disclosed in U.S. Pat. No. 5,842,312 include (1) the same component(s) is (are) compressed, whatever the direction of the shock, (2) by the use of suitably shaped SEA components, the SEA components can be self-limiting, so that compression of the SEA components outside the hysteresis (which will result in permanent deformation) cannot take place, and (3) the frame can include stops which ensure that the SEA component is not compressed beyond its superelastic limit. In some such apparatus, the SEA component, in the absence of any shock applied to the apparatus, is compressed so that the SEA component is a little way into the top end of its stress-strain hysteresis, for example 5-15% into its stress-strain hysteresis, so that a shock applied to the frame compresses the SEA component further into its stress-strain hysteresis. In other embodiments, the SEA component is not compressed into its stress-strain hysteresis in the absence of a shock, but is compressed into its stress-strain hysteresis when a sufficiently large shock is applied to the frame. In those other embodiments, initial shock-induced changes in the frame may or may not cause compression of the SEA component into its stress-strain hysteresis.

One embodiment of the fourth aspect of the invention comprises (1) at least one SEA component which, in the absence of any shock applied to the apparatus, has a first configuration, and (2) a frame which comprises a first frame member which is secured to the SEA component at one or more first points, and a second frame member which is secured to the SEA component at one or more second points which are spaced apart from first points, whereby, when shock is applied to the frame, the SEA component is distorted in bending or torsion or both. The apparatus can comprise one or more additional frame members which are secured to the SEA component at additional points which are spaced apart from the first and second points. In some embodiments, the SEA component, in the absence of any shock applied to the apparatus, is distorted so that the SEA component is in its stress-strain hysteresis, so that a shock applied to the frame distorts the SEA component into a different point in its stress-strain hysteresis. In other embodiments, the SEA component is not distorted into its stress-strain hysteresis in the absence of a shock, but is distorted into its stress-strain hysteresis when a sufficiently large shock is applied to the frame. In those other embodiments, initial shock-induced changes in the frame may or may not cause distortion of the SEA component into its stress-strain hysteresis.

In the third aspect of the invention, the SMA component is in the form of a bar. The term "bar" is used herein in a broad sense to include any elongate member. The bar is preferably (but need not be) straight and preferably has (but need not have) the same cross-section throughout its length. In one embodiment, a first frame member is secured to an SEA component at first points which are at or near the end of the SEA component, and the second frame member is secured to the SEA component at one or more second points between the ends of the elongate SEA component, for example at a single second point near the middle of the elongate SEA component, whereby, when shock is applied to the frame along an axis which is at an angle, e.g. a right angle, to the axis of the elongate SEA component, the SEA component is distorted in bending or torsion or both.

In one embodiment of the fourth aspect of the invention, the SMA component comprises an SEA component in the form of a ring or other hollow body having a continuous periphery. In one such device, the first and second frame members are secured to the hollow body at points which are generally opposite to each other, whereby, when the first and second frame members are pushed together or pulled apart by a shock, the hollow body is deformed. In another such device, there are three or more frame members distributed around the SEA component, for example for frame members equally spaced around a ring-shaped SEA component.

In the fourth aspect of the invention shock is absorbed not only by an SMA component which is composed of a super elastic alloy (SEA) but also by an SMA component which is composed of a martensitic shape memory alloy (M-SMA). The two SMA components can be separate from each other, for example arranged "in parallel" or "in series", so that a shock results in the same or a similar distortion of both SMA components; or the two SMA components can be joined together to form a composite SMA component which comprises a first sub-component which is composed of a super elastic alloy (SEA) and a second sub-component which is composed of a martensitic shape memory alloy (M-SMA) and which is in contact with the first sub-component. In this embodiment, the M-SMA component improve damping efficiency in the small deformation range, since it is deformed reversibly and absorbs energy in both deformation directions. A composite component of this kind can be used in the apparatus of the other aspects of the invention and can also be used in known apparatus making use of SMA alloys.

The invention also includes methods of protecting an article from shock, particularly repetitive shocks, for example from acoustic, seismic, blast, impact, inertial, water wave and wind loading shocks, using apparatus as described above. A very wide variety of articles, e.g. medical devices, electronic assemblies, vehicles, bridges and buildings, can be protected in this way, making use of apparatus of appropriate size, from small, e.g. using SMA components having a maximum dimension of 5 to 25 mm, to relatively large, e.g. using SMA components having a maximum dimension of 250 to 1000 mm, and frames (which can be secured to, or be an integral part of, the article to be protected) having for example a maximum dimension which is 1.2 to 20 times the maximum dimension of the SMA component.

The various apparatus of the invention can optionally have one or more of the following optional characteristics.

1. The SMA component is composed of a super elastic alloy (SEA), for example a nickel titanium alloy (commonly known as Nitinol).
2. There is a plurality of SMA components, for example 2-100, e.g. 4-100 SMA components. The components can be the same or different. If they are different, they can be composed of the same SMA but have different dimensions, or they can be composed of different SMAs having different transformation temperatures, and have the same or different dimensions. The SMA components are preferably arranged so that they provide a balance response to shock in order to prevent twisting or bending of the frame, and/or twisting and bending of the SMA components in apparatus which relies on extension or compression of the SMA components to absorb shock.
3. There can be a plurality of SMA components which are arranged around a central core which is part of the frame. Components so arranged can be more easily placed when the apparatus is so constructed, and, if necessary, replaced if any of the SMA components needs to be changed, either because it has been damaged or because the characteristics of the device are to be changed by replacing or modifying some or all of the SMA components. Furthermore, components so arranged can be more easily cooled in order to increase damping effectiveness or to prolong the damping over a larger number of deformation cycles.
4. In the tension device, the SMA component is in the form of a straight wire, a ribbon, a tube, a helical spring, or a bellows.
5. In the compression device, the SMA component is in the form of a solid column having a round or other cross-section, a hollow column having a round or other cross-section, a helical coil spring (which is deformed in torsion), a bellows, a stack or a coil of waveform washers, a stack of Belleville washers, e.g. alternating superelastic SMA and martensitic SMA Belleville washers, or a sponge material.
6. In apparatus in which the SMA component is a hollow component which is deformed by bending, the SEA component is in the form of a circular ring which is held in two "saddles", so that the ring is stretched into an ellipse in the axial direction when the two saddles are pulled apart and compressed into an orthogonal ellipse when the two saddles are pushed together. Single or multiple rings can be employed, and can be pre-bent from a circular or other unstressed shape and/or biased against each other so the damping elements are preloaded. Especially with superelastic SMA rings, this can be used to aid damping at small deflections of the damping device.

In this embodiment, hybrid damping elements composed of superelastic rings that are concentric with martensitic SMA rings or other deformable metal rings can be used to achieve various damping characteristics in the device.

7. In apparatus in which the SEA component is deformed into its stress-strain hysteresis in the absence of shock, the deformation is such that the SEA component is near the boundary of its stress-strain hysteresis, thus maximizing the extent to which the SEA component can be further deformed without undergoing the permanent deformation which will result if the metal falls outside the hysteresis. For example, the distortion is such that the SEA component is from 10 to 20% of its possible distortion within the stress-strain hysteresis. This removes purely elastic response of the SEA component when the apparatus is subject of shock, and ensures hysteresis damping.
8. The apparatus comprises a stop which limits the deformation of the SEA component, when the frame is subject to shock, so that the SEA component remains inside the hysteresis. The apparatus may be constructed so that one or a number of different stops can be selected.
9. The apparatus includes components which can be adjusted so that the SEA component(s) can be deformed to a greater or lesser extent (including the absence of any deformation, for example when the apparatus is being built), either to change the response of the apparatus to shock or to restore the response of the apparatus after excessive shock has changed the dimensions of the SMA component.
10. The apparatus includes a hollow outer body and a center shaft which together maintain the SMA component(s) at the desired degree of deformation in the absence of shock.
11. The apparatus is attached to a building, for example to the structural framework of a building, in order to absorb earthquake shocks.

The utility of the damping devices disclosed herein is based on the energy absorbing capability of both Superelastic and Martensitic forms of Shape Memory Alloys. The general form of the dampers can for example be in the general form of a standard automotive shock absorber, with a center section incorporating the Shape Memory Alloy (SMA) components in whatever form and two end attachments so the damper can be incorporated into a structure where it may be subjected to extension or compression forces (push/pull).

In some of the damping devices, the SMA components are held in such a way that they are subjected to axial tension when the damper experiences either push or pull forces. In others of the damping devices, the SMA components are held in such a way that they are subjected to compression when the apparatus is subject to push or pull forces. In yet other apparatus, the SMA components are subjected to one set of complex bending forces when the apparatus is subject to push forces and a different set of complex bending forces with the apparatus is subject to pull forces.

The body of the damper may be made in such a manner that the SMA components are contained within a hollow outer damper body which serves, along with a center shaft, to apply the forces to the SMA components. This could be, for example, an outer tube. An alternative form of damper may be made in which the damper components which transmit forces to the SMA components are in the axial center of the damper and the SMA components are arranged outside them.

In some versions of these dampers, the SEA component self limits its range of deformation, thus protecting itself from going beyond the deformation range which can be accommodated by the austenite/martensite transformation or deformation. In other versions, the frame of the damper is made to limit the range of deformation of the SMA component(s) by going to a 'hard stop' at the desired range of deformation to protect the SMA components from being excessively deformed. The dampers may also be made in such a way that there is a built-in adjustment potential that allows for the SMA components to be preloaded to a desired stress or strain level during assembly of the damper at zero external load. The deformation of the SMA components, in the absence of shock, can be at whatever part of the loading curve is desired.

The various components of the dampers, other than the SMA components, can be made from affordable and readily available materials such as mild steel or stainless steel. The shapes of components can be quite simple and readily made by well-known techniques such as lathe turning.

All the disclosed dampers can make use of SMA components which are superelastic versions (SEA) of Shape Memory Alloys, and such components deliver excellent damping behavior within much of the deformation range of SEAs. However, to expand that range, especially into the small deformation region, this invention includes the possibility that SMA components of martensitic alloy are attached to the SEA components and the damper frame, so that during deformation and springback of the SEA components; the martensitic SMA components are deformed reversibly and absorb energy in both deformation directions. In this way, improved damping can be obtained, especially in the small deformation portion of the loading spectrum.

Apparatus including both SEA and SMA components can incorporate any one of a wide variety of forms of M-SMA component working in parallel with the SEA components described in both the tension or compression device. For example, a cylindrical bellows made of M-SMA of appropriate thickness can be positioned outside the SEA components and deformed concurrently with the SEA components in either tension or compression devices. The M-SMA component is preferably incorporated into the apparatus in such a way that it is forced to deform in both directions as the SEA component is deformed due to the application of force to the device and then is deformed back to its original shape due to the shape-recovery forces of the SEA component.

Optional features of the different aspects of the invention include the following.
1. For the compression device in which the components are compressed: The components may be a hollow cylinder, helical coil component(s) (in which the deformation is in torsion), a bellows, a stack of Belleville washers, a stack or coil of waveform washers, sponge material, or a variety of other forms.
2. For the tension device in which the components are stretched, the components might be straight wires, ribbons, tube(s), helical springs, a bellows, or other shapes. Preferably the components can be readily replaced if they are damaged or broken.
3. For the tension device in which the components are on the outside of the device, it is possible to more easily combine cooling methods or apparatus with the damper to increase the damper effectiveness or to prolong the damping over a larger number of deformation cycles.
4. For the damper in which the SMA component is deformed in bending, a particularly advantageous form of component is a ring which is held in two 'saddles' such that the ring is stretched into an ellipse in the axial direction during 'pull', and compressed into an orthogonal ellipse during a 'push' loading. This component is particularly versatile in manufacture and implementation. The ring can comprise one or more concentric layers of superelastic SMA, and one or more concentric layers of martensitic SMA and/or a non-SMA metal. In one useful embodiment, the frame comprises a central member with one or more rings on one side of the central member and an equal number of similar rings on the other side of the central member, thus producing a balanced response to changes in length of the central member.

Useful features of preferred embodiments of the present invention include the following.
1. The SMA dampers can be constructed entirely of metal, and, therefore, have very long shelf life, in contrast to many dampers which contain hydraulics or pneumatics which tend to leak and/or seals which tend to harden, crack and degrade.

2. The SMAs do not work harden under deformation cycling, in contrast to mild steel dampers, which harden after a small number of cycles and must be replaced.

3. The SMA dampers tend to have a natural limit to their deformation, at which point they get dramatically stronger and resist further deformation. This is true for both the SEA version and the martensitic version. This is contrary, for example, to lead dampers in which the lead is deformed in huge amounts to absorb deformation energy, but there is no limit to the flow of the lead, as it continuously re-anneals itself at room temperature and just keeps flowing without a natural stop.

4. The SMA dampers, especially the SEA and hybrid dampers, will return themselves to their original shape or position after the input deformation forces are removed, thus returning the damped structure to its original configuration.

5. The designed force/stroke/energy absorption of the SMA dampers is predictable and consistent, in contrast to some others, such as friction dampers, which may vary greatly from design to design depending on age, contamination, previous cycling, etc.

6. The design flexibility and compactness of the SMA dampers can be very good, encouraging their use in many types of construction, without requiring major design changes to accommodate them.

For examples of ways in which this invention may be utilized, reference may also be made to the documents incorporated herein by reference.

Figure 1B:
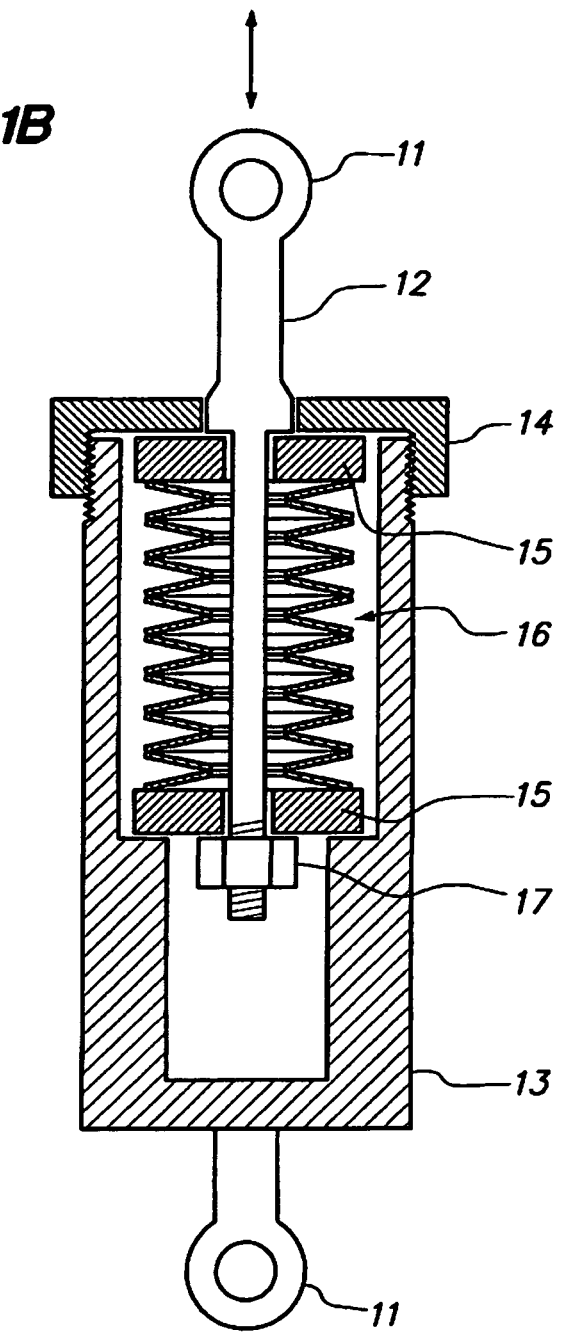
FIG. 1B is similar to FIG. 1A, except that the shock-absorbing component is a pile of Belleville washers, e.g. alternating superelastic SMA and martensitic SMA Belleville washers.

Referring now to the Figures, FIGS. 1A and 1B are examples of compression devices. The reference numerals designate the various components and their functions as follows.
- 11) end attachments
- 12) center push/pull rod
- 13) cylindrical outer casing.
- 14) threaded end cap, which allows assembly and adjustment of the compression of the shock-absorbing component
- 15) sliding discs which transmit compression to the shock-absorbing component.
- 16) shock-absorbing component, preferably comprising a superelastic SMA.
- 17) adjustment not to apply the desired compression to the shock-absorbing component.

Figure 2:
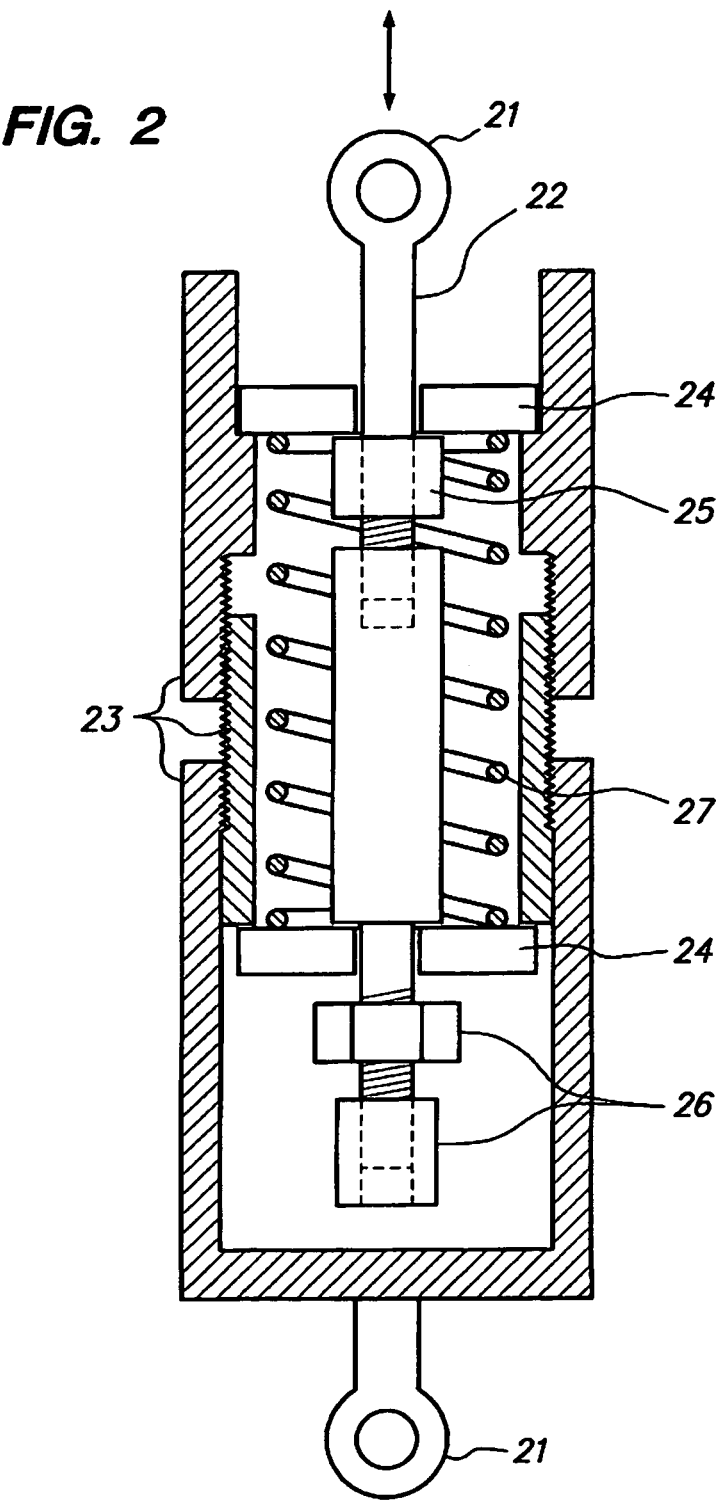
FIG. 2 is a cross-sectional view of a damping device which comprises a shock-absorbing component in the form of a superelastic SMA helical coil spring, and a frame which surrounds the shock-absorbing component and subjects it to axial tensile loading both when the axial length of the frame is increased and when the axial length of the frame is decreased, and which includes stops which limit the maximum deformation of the shock-absorbing component in both directions.

FIG. 2 is an example of a tension device. The reference numerals designate the various components and functions as follows.
- 21) end attachments
- 22) center push/pull rod
- 23) cylindrical threaded outer casing components which allow assembly and adjustment of tension in the shock-absorbing component
- 24) sliding discs attached to the ends of the shock-absorbing component
- 25) tensioning nut to adjust tension of the shock-absorbing component.
- 26) adjustment means to set the limits of extension of the shock-absorbing components in both push and pull of the device
- 27) shock-absorbing component, preferably comprising a superelastic SMA.

Figure 2A:
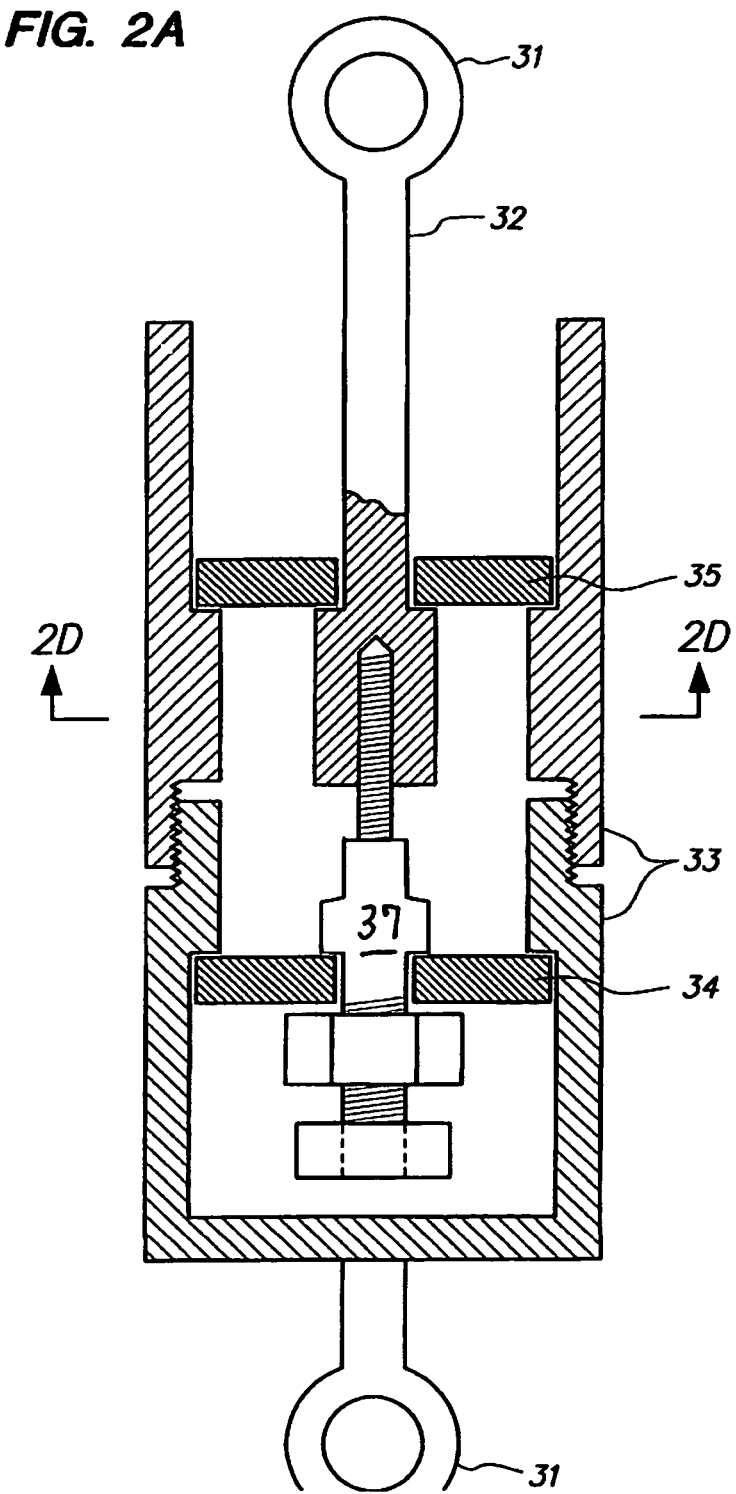
FIG. 2A is similar to FIG. 2 except that the shock-absorbing component is in the form of a superelastic SMA rod.

FIG. 2A is also an example of a tension device. The reference numerals designate the various components and functions as follows.
- 31) end attachments
- 32) center push/pull rod
- 33) cylindrical threaded outer casing components which allow assembly and adjustment of tension in the shock-absorbing component
- 34) sliding discs attached to the ends of the shock-absorbing component
- 35) tensioning nut to adjust tension of the shock-absorbing component.
- 37) shock-absorbing component, preferably comprising a superelastic SMA.

Figure 2D:
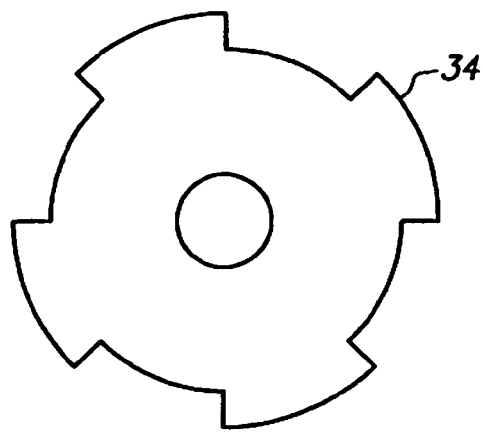
Figure 2D:
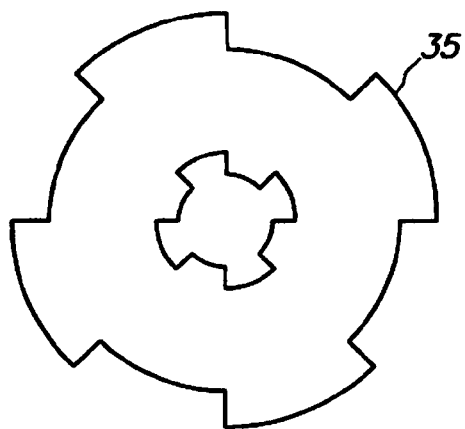
Figure 2D:
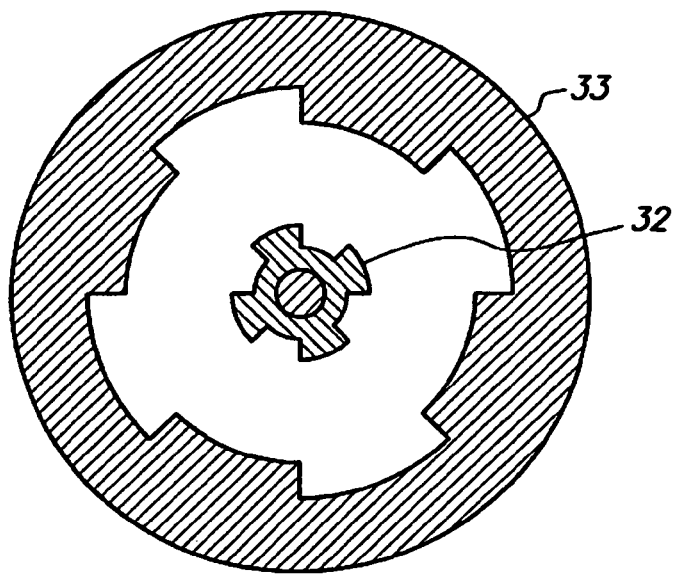

FIGS. 2B and 2C show the shapes of the components 3435, which are castellated so that the sliding discs can return to slide by, and then turned back so that they lock and can transmit the push/pull forces. FIG. 2D is a cross-section on the line 2D-2D of FIG. 2A.

Figure 3:
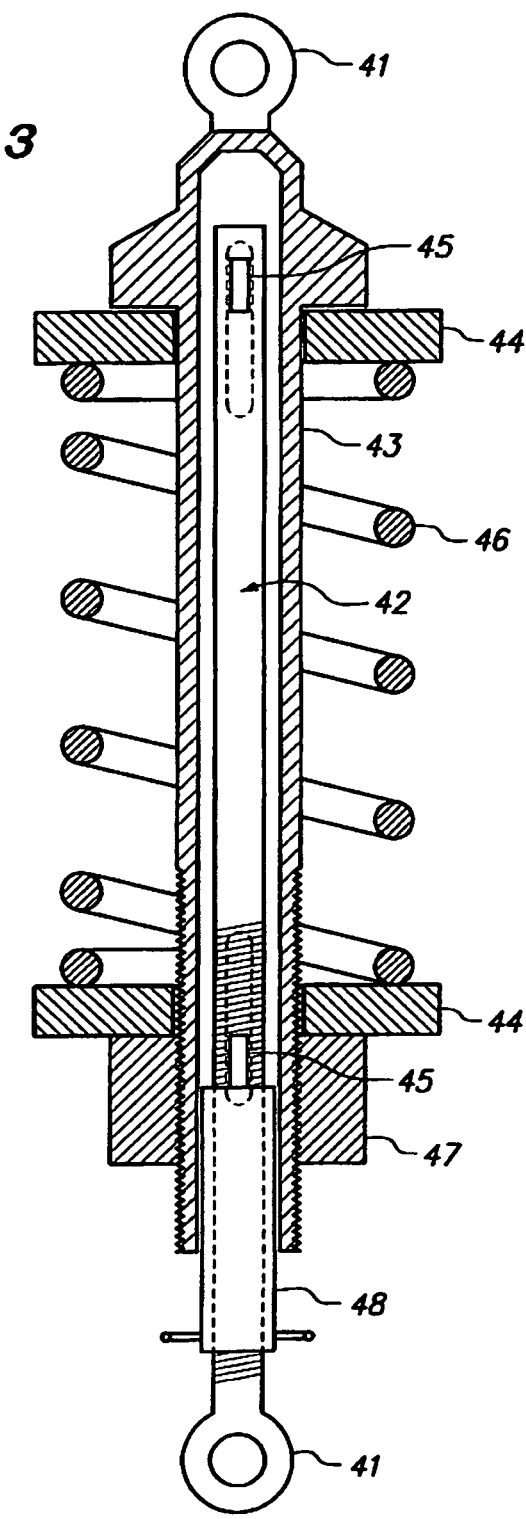
FIG. 3 is a cross-sectional view of a damping device with comprises a shock-absorbing component in the form of a superelastic SMA helical coil spring, and a frame which subjects the shock-absorbing component to axial compressive loading both when the axial length of the frame is increased and when the axial length of the frame is decreased, the shock-absorbing component being exposed on the exterior of the frame.
Figure 4:
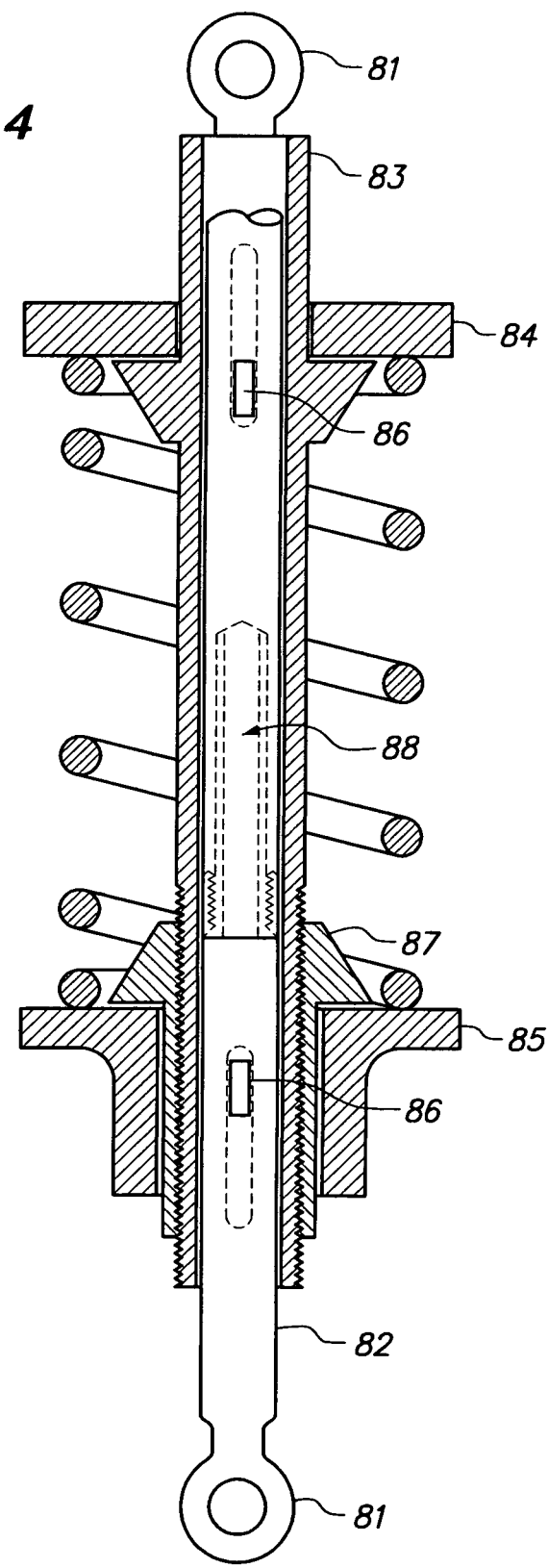
FIG. 4 is similar to FIG. 3, except that the frame subjects the shock-absorbing component to axial tensile loading both when the axial length of the frame is increased, and when the axial length of the frame is decreased.

FIGS. 3 and 4 are examples of compression devices. The reference numerals designate the various components and functions as follows.
- 41, 81) end attachments.
- 42, 82) center push/pull rod.
- 43, 83) tubular push/pull component.
- 44, 84) sliding discs to transmit compression.
- 45, 85) sliding discs stops, which are rectangular bars inserted through slots in components 42 and 43.
- 46, 89) shock-absorbing component, preferably comprising a superelastic SMA.
- 47, 87) adjusting nut to apply compression to shock-absorbing component.
- 48, 88) threaded adjusting tube with handles to adjust along component 42 and against component 45, to apply compression to the shock-absorbing component.

In FIG. 4, the shock-absorbing component 89 is attached to the sliding discs 84, 85. The outer tube 83 has the stop under the upper disk incorporated as part of the tube, and there is a slot through it to allow insertion of sliding disc stop 86 into the slot in the inner rod 82. The lower stop against the bottom sliding disc 85 is threaded onto the outer tube 83, and thus can be turned to adjust the tension in the shock-absorbing element by pushing against the lower sliding disc 85. An opening is cut through the outer tube 83, the threaded lower stop 87, and the bottom sliding disc 85 to allow insertion of the lower sliding disc stop 86 after the threaded lower stop 87 is turned to adjust initial tension in the shock-absorbing component. Before inserting the lower sliding disc stop, the lower end of the inner rod is turned relative to the upper end using the mated threaded section 88 to bring the slot in 82 into position, so that the inserted sliding disc stop 86 will rest firmly against the opening in the bottom sliding disc. In operation, pulling the attachments apart will pull the upper sliding disc 84 upwards due to the incorporated stop that is part of the outer tube 83, while the lower sliding disc is pulled downwards by the sliding disc stop 86. If the attachments are pushed towards each other, the upper sliding disc stop 86, will push the upper sliding disc 84 upward while the threaded lower stop 87 pushes the lower sliding disc 85 downwards.

Figure 5:
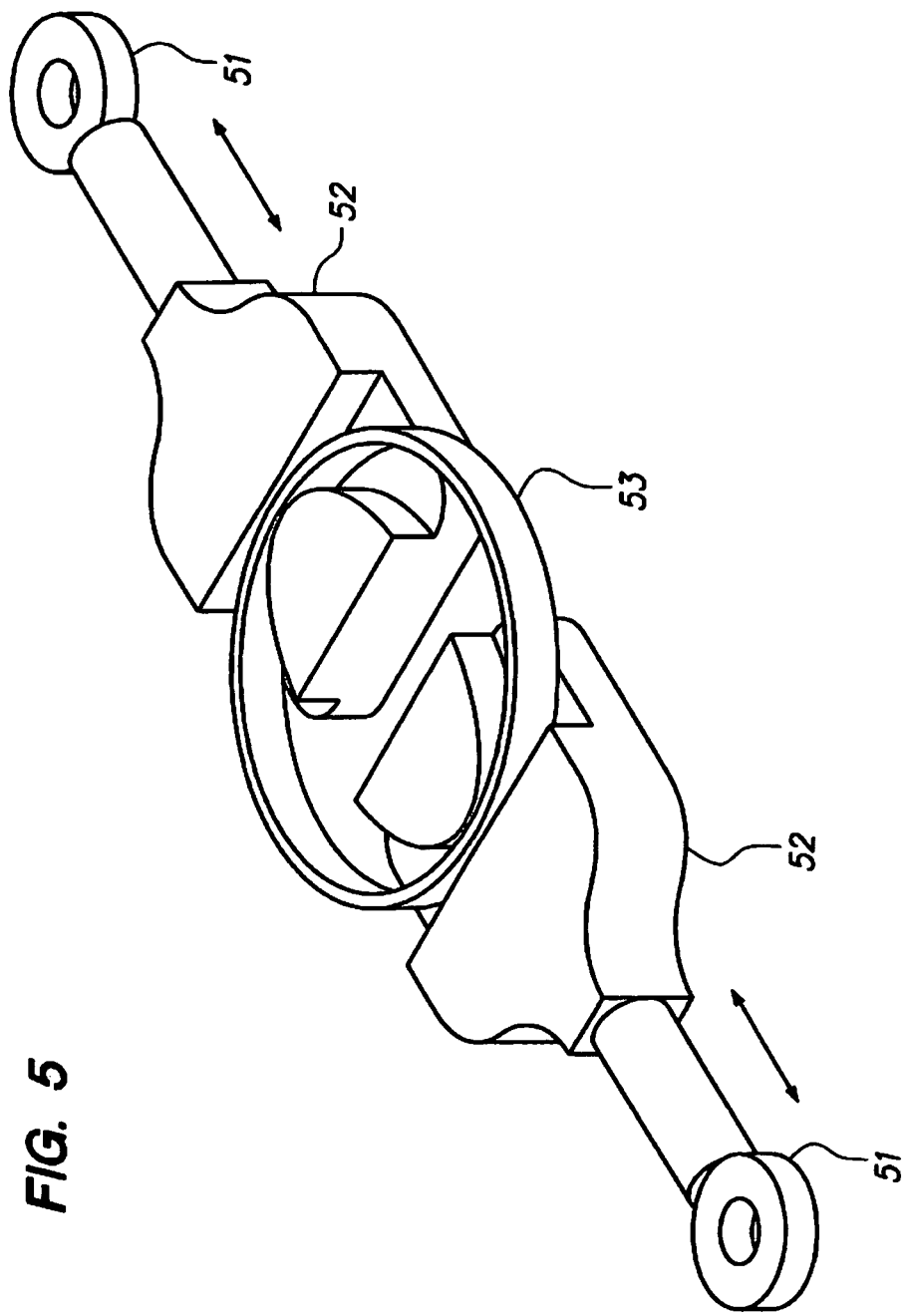
FIG. 5 is a perspective view of a damping device which comprises a shock-absorbing component in the form of a superelastic SMA ring, and a frame which subjects the shock-absorbing component to compression or elongation along a major chord when the axial length of the frame changes.

FIG. 5 is an example of shock-absorbing apparatus comprising a ring-shaped shock-absorbing component. The reference numerals designate the various components and functions as follows.
- 51) end attachments.
- 52) ring-holding fixtures ("saddles")
- 53) shock-absorbing component, preferably comprising a superelastic SMA.

Figure 6:
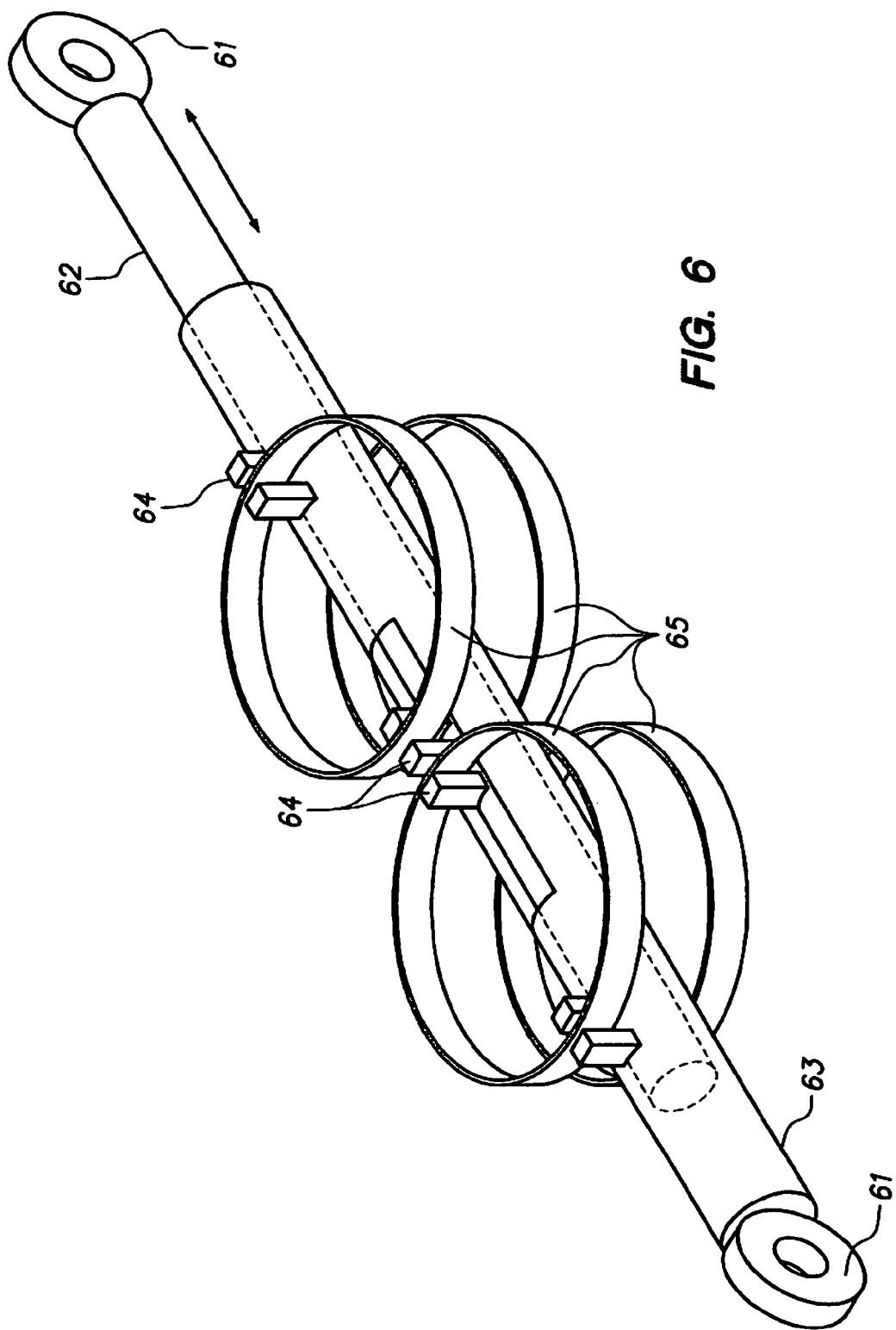
FIG. 6 is a perspective view of a damping device which comprises four shock-absorbing components, each in the form of a superelastic SMA ring, and a frame which subjects the shock-absorbing components to compression or elongation along a major chord when the axial length of the frame changes.

FIG. 6 is an example of shock-absorbing apparatus comprising a plurality of ring-shaped shock-absorbing components.

The reference numerals designate the various components and their functions as follows.

61) end attachments.
62) inner push/pull rod component
63) outer push/pull rod component.
64) ring-holding fixtures ("saddles").
65) shock-absorbing components, preferably comprising a superelastic SMA.

Figure 7:
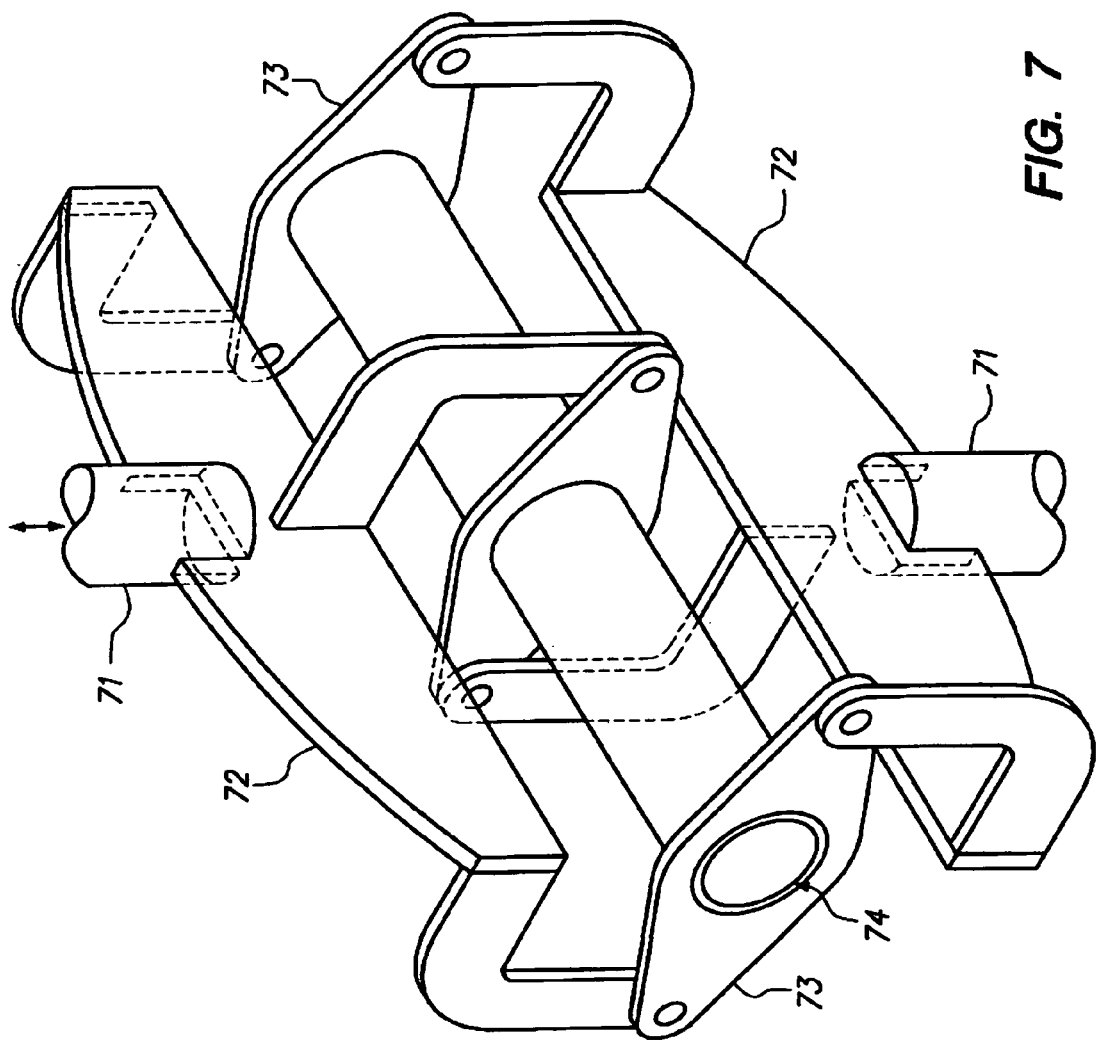
FIG. 7 is a perspective view of a damping device which comprises two shock-absorbing components, each in the form of a tube, and a frame which subjects the shock-absorbing components to torsional distortion in one circumferential direction when the axial length of the frame is increased, and in the opposite second circumferential direction when the axial length of the frame is decreased.
Figure 8:
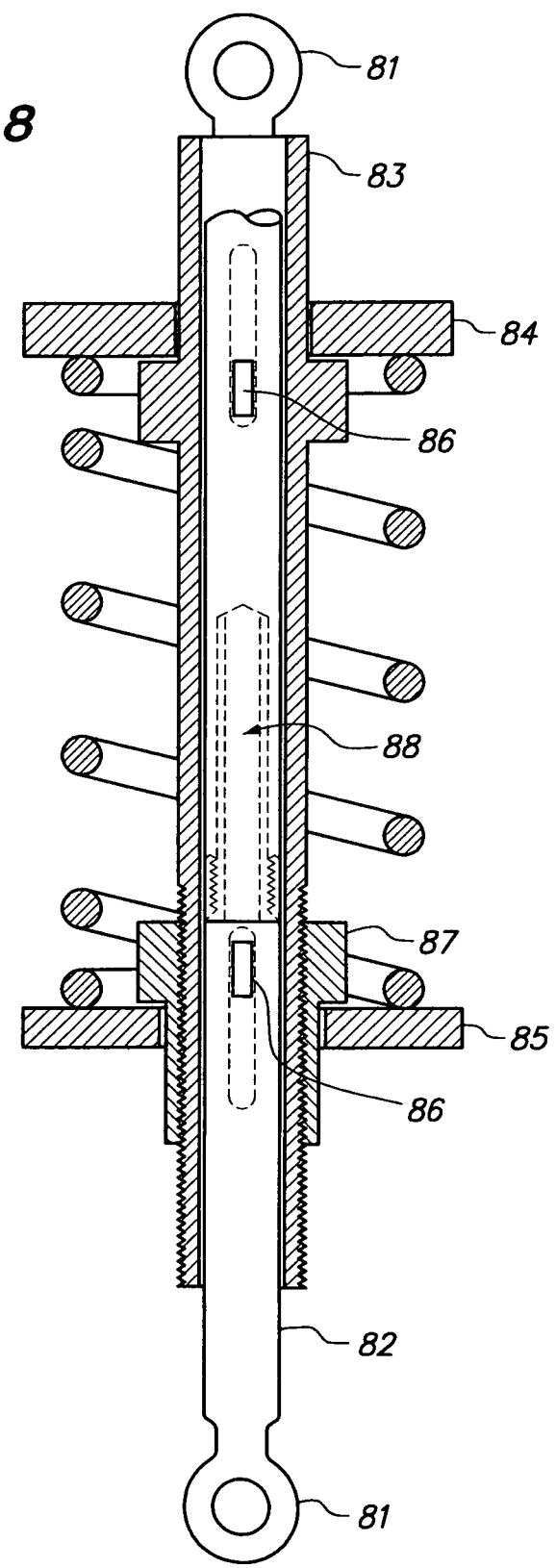
FIG. 8 is similar to FIG. 3, but the frame includes additional adjustment means.

FIG. 7 is an example of an apparatus in accordance with the third aspect of the invention. The reference numerals designate the various components and their functions as follows.

71) components of the frame through which shock is transmitted to the apparatus.
72,73) components of the frame which convert relative linear movement of the components 71 into forces which twist the shock-absorbing component.
74) tubular shock-absorbing component.

Depending on the method of attaching the shock-absorbing component (s) to the frame in apparatus of the invention, it is possible to replace SMA components which become damaged. When the apparatus comprises multiple SMA components, the apparatus will in many cases continue to provide effective protection against shock even if there is damage to one or even several of the shock-absorbing components.

The invention claimed is:

1. Apparatus for absorbing shock from a first direction and from an opposite second direction, the apparatus comprising
   (1) a frame which is distorted in a first way when the apparatus is subjected to shock from the first direction and in a second way when the apparatus is subjected to shock from the second direction, and
   (2) one or more shock-absorbing SMA components each of which consists of a shape memory alloy (SMA),
   at least one of the SMA components (i) being in the form of a hollow member having a cross-section which defines a void within the member, and (ii) comprising a superelastic SMA, and
   the SMA shock-absorbing components being linked to the frame so that distortion of the frame in the first way distorts at least one of the SMA shock-absorbing components comprising a superelastic SMA by changing its cross-section in a first way, and distortion of the frame in the second way distorts the shock-absorbing component by changing its cross-section in a second way;
   the shock-absorbing SMA components being the sole shock-absorbing components of the apparatus;
wherein
at least one of the shock-absorbing SMA components comprises a ring which (i) has a closed annular cross-section, and (ii) comprises an annular member composed of a superelastic SMA, and distortion of the frame in the first way distorts the annular member so that a major chord of the ring decreases and distortion of the frame in the second way distorts the annular member so that the major chord of the ring increases.

2. Apparatus according to claim 1 wherein the ring comprises a first annular member which is composed of a superelastic SMA and a second annular member which is composed of a martensitic SMA and which is attached to the first annular member.

3. Apparatus according claim 1 which comprises a plurality of said hollow shock-absorbing members comprising a superelastic SMA, and said hollow shock absorbing superelastic SMA components are arranged so that they provide a balanced response to shock which prevents twisting or bending of the frame when the superelastic shock-absorbing components are deformed by shock,
   and wherein the apparatus comprises a plurality of said hollow shock-absorbing components comprising a superelastic SMA, and each of said hollow shock absorbing components comprising a superelastic SMA is a ring which has a closed annular cross-section, and distortion of the frame in the first way distorts each of the rings so that a major chord of the ring decreases and distortion of the frame in the second way distorts each of the rings so that the major chord of the ring increases.

4. Apparatus for absorbing shock from a first direction and from a substantially different second direction, the second direction comprising a component which is opposite to the first direction, the apparatus being at a temperature of 0 to 30° C. and comprising
   (1) a frame which is distorted in a first way when the apparatus is subjected to shock from the first direction and in a second way when the apparatus is subjected to shock from the second direction and
   (2) one or more shock-absorbing SMA components each of which consists of a shape memory alloy (SMA),
   at least one of the SMA components being a single hollow member which (i) has a cross-section which defines a void within the member, and (ii) comprises an SMA which is a superelastic SMA in the temperature range 0 to 30° C.;
   said SMA shock-absorbing components being linked to the frame so that distortion of the frame in the first way distorts said hollow shock-absorbing member comprising a superelastic SMA by changing its cross-section in a first way, and distortion of the frame in the second way distorts said hollow shock-absorbing member comprising a superelastic SMA by changing its cross-section in the first way or in a second way;
   the apparatus being free from hydraulic and pneumatic fluids;
   the apparatus being constructed entirely of metal, and the apparatus
   (i) being at a temperature of 0 to 30° C.,
   (ii) being constructed entirely of metal; and
   iii comprising a plurality of SMA shock-absorbing components arranged on opposite sides of a central member which is not subject to bending forces when the shock-absorbing components are deformed by shock.

* * * * *